(No Model.) 2 Sheets—Sheet 1.
H. E. BROWN.
MICROMETER GAGE.
No. 454,516. Patented June 23, 1891.
*Fig. I.*
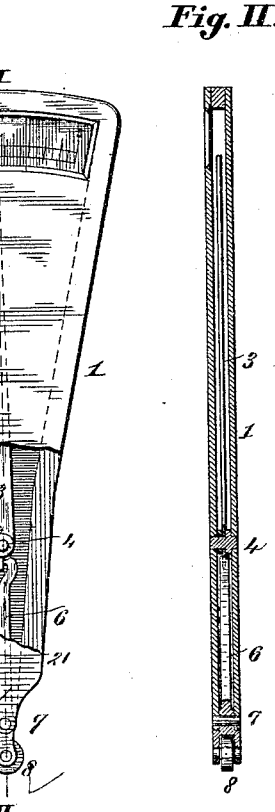
*Fig. II.*
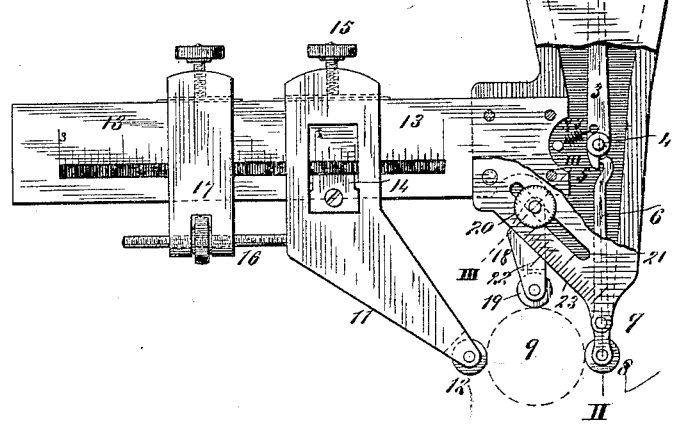
*Fig. III.*
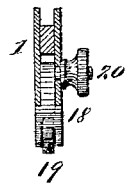
Attest:
E. Arthur
E. L. Knight
Inventor:
Harvey E. Brown
By Knight Bro'
attys (No Model.) 2 Sheets—Sheet 2.
H. E. BROWN.
MICROMETER GAGE.
No. 454,516. Patented June 23, 1891.
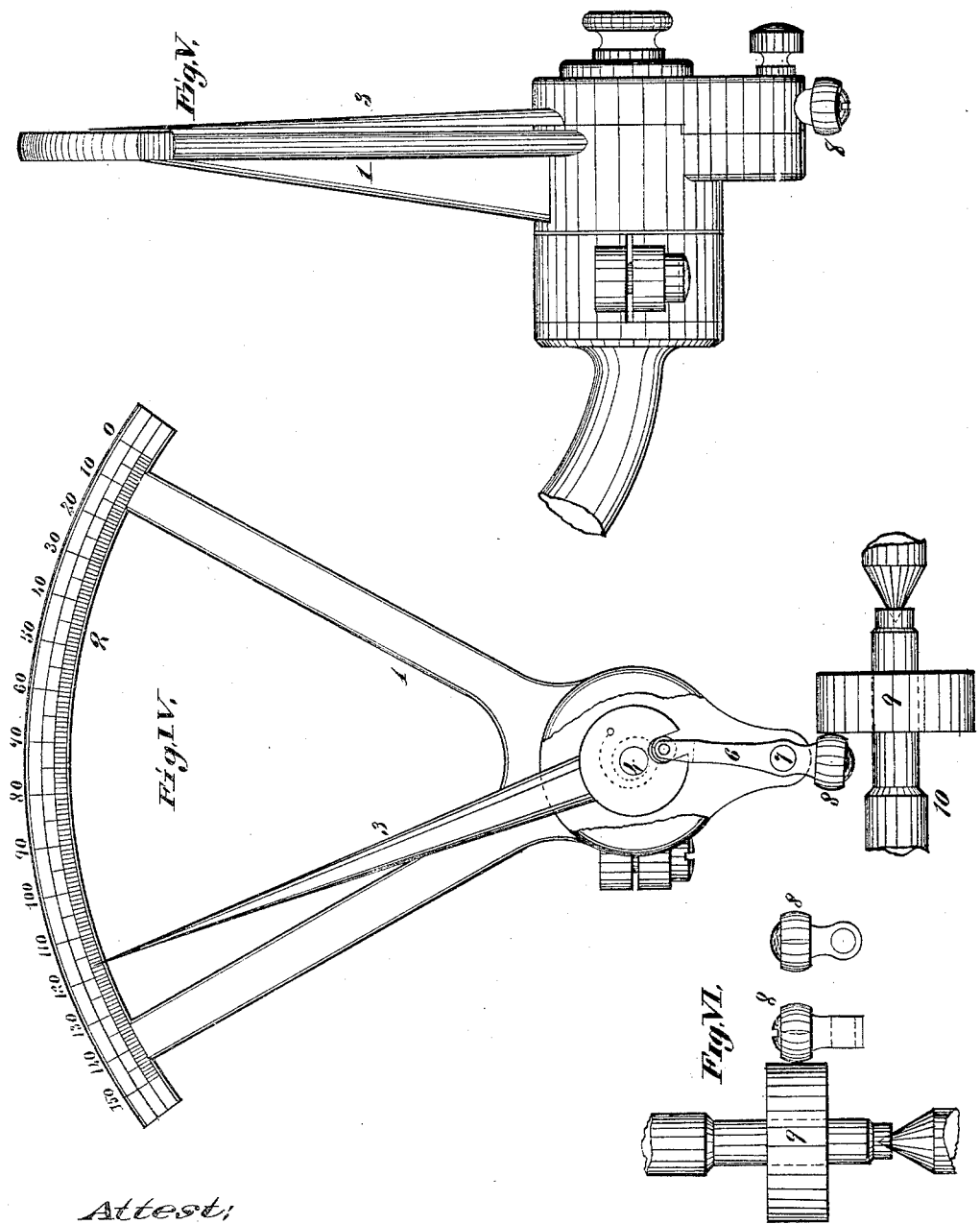
Attest:
E. Arthur
E. L. Knight
Inventor
Harvey E. Brown
By Knight Bro
Atty's

UNITED STATES PATENT OFFICE.

HARVEY E. BROWN, OF ST. LOUIS, MISSOURI, ASSIGNOR OF ONE-HALF TO JOSEPH BOYER, OF SAME PLACE.

MICROMETER-GAGE.

SPECIFICATION forming part of Letters Patent No. 454,516, dated June 23, 1891.

Application filed April 26, 1890. Serial No. 349,689. (No model.)

*To all whom it may concern:*

Be it known that I, HARVEY E. BROWN, of the city of St. Louis, in the State of Missouri, have invented a certain new and useful Improvement in Instruments for Measuring Work while in Motion, of which the following is a full, clear, and exact description, reference being had to the accompanying drawings, forming part of this specification.

My invention relates to a device for measuring or testing work while in motion; and my invention consists in features of novelty hereinafter fully described, and pointed out in the claims.

Figure I is a side elevation illustrating my invention in the form in which it is used for ascertaining the diameter of a rod or piece of work while the same is in motion under the tool by which it is being reduced to the proper size. Fig. II is a section taken on line II II, Fig. I. Fig. III is a section taken on line III III, Fig. I. Fig. IV is an elevation showing my invention in the form in which it is used to indicate the thickness or width of the face of an object (such as a pulley, for instance) while in motion under the tool. Fig. V is an edge view of same, and Fig. VI is a detail view showing the form of bearing between the lever of the indicating-instrument and the object being worked upon when it is desired to obtain or test the peripheral trueness of the object.

This instrument in all of its forms is designed to test the object being worked upon while in motion, and it is designed to be used where a very accurate degree of trueness is desired, and its use not only obviates the necessity of stopping the machinery to measure the object, but also affords a means for testing the trueness to the very greatest amount of accuracy of all parts of the object being worked upon.

Referring to the drawings, 1 represents the body of the indicator, provided with a graduated dial or scale 2.

3 represents a finger or pointer pivoted to the body at 4, and which has an extension 5 beyond the pivot.

6 represents a lever pivoted to the body at 7, and the inner end of which bears against the extension 5, as shown in Figs. I and IV.

The outer end of this lever is provided with a roller 8, which bears against the object 9 being worked upon. This object may be a rod, as shown in Fig. I, or a pulley, as shown in Fig. IV, and still other forms of objects may be tested by the use of this instrument.

The object being worked upon is mounted in the usual way upon the mandrel 10 (see Fig. IV) of the carriage of the lathe, and the instrument is also carried by the carriage. The tool for doing the work is mounted in the usual way, and of course does not turn with the object being worked upon. In the form shown in Fig. I there is an arm 11, supporting a roller 12 opposite to the roller 8 of the lever 6. This arm 11 is mounted on a slide 13, which, if desired, may be graduated to correspond or work in connection with the graduations 14 on the arm 11. These graduations, however, are not essential to the invention. The arm 11 is provided with a set-screw 15, by which it is held to its adjustment on the slide, and it may be moved to a nicety by means of an adjusting-screw 16, secured to the slide 13 by an adjustable block 17. The body of the instrument is also provided with an arm 18, provided with a friction-roller 19, that bears upon the top of the object being worked upon, and to accommodate the instrument to objects of different sizes the slide 18 is held to the body by a set-screw 20, fitting in a slot 21 of the body, the arm having a mark 22, which corresponds or works in conjunction with a scale 23 on the body. As the rod is turned, the rollers 8, 12, and 19 all bear against it, the roller 8 being held over against the object by means of a suitable spring 23, which pulls the upper end of the finger 3 to the left, and consequently the lower end of the lever up against the rod 9. It will thus be seen that the scale 2 will indicate the diameter of the rod, and any irregularity in the rod will be imparted to the finger while the work is in motion, and thus the slightest degree of irregularity in the work will be imparted to the finger, causing its outer end to vibrate. When the tool has reduced the rod to a condition in which no movement is imparted to the outer end of the finger and has reduced it to the proper size, as indicated by the finger and dial, the workman is assured that the rod is as accurately reduced as it is possible for a machine to reduce it, and this is attained without stopping the work, which proceeds continuously.

As shown in Figs. IV and V, the instrument is constructed for use in testing the accuracy of a pulley or other object against the side of which the lever 8 presses. Any irregularity in the pulley will be indicated by the finger, as stated, and by reducing the pulley until the finger points at the proper place the workman is assured that the pulley is completed in the most accurate manner possible.

This invention is particularly designed for fine work, where an object wants to be made accurate to the extent of one or two thousandths of an inch, and by its use this information is obtained without stopping the work.

The instrument may be used for ascertaining the peripheral accuracy of a pulley or other object by arranging the pulley 8 at right angles to the pivot 7 by mounting the roller on the short arm 25, which is placed on the pivot 7, so as to turn with the lever.

The spring in the form of instrument shown in Figs. IV and V may surround the pivot of the finger in the form of a watch-spring, one end of the spring being secured to the fixed part of the body or to the pivot which is not to be turned with the finger, and the other end of the spring being connected to the finger or to the hub of the finger.

I claim as my invention—

1. In an instrument for measuring work while in motion, the combination of a body provided with a scale, a pivoted finger, and a pivoted lever engaging the finger at one end and provided on the other end with a roller, which bears against the work, substantially as and for the purpose set forth.

2. In an instrument for measuring work while in motion, the combination of a body provided with a scale, a spring-finger pivoted to the body and projecting beyond the pivot, a lever pivoted to the body and bearing against the projection of the finger that extends beyond the pivot, and a friction-roller on the lever, which bears against the object being worked upon, substantially as and for the purpose set forth.

3. In an instrument for measuring work while in motion, the combination of a body provided with a scale, a spring-actuated finger pivoted to the body, a lever pivoted to the body and provided with a friction-roller and which bears against a projection of the finger, and an adjustable arm 11, provided with a friction-roller 12, substantially as and for the purpose set forth.

4. In an instrument for measuring work while in motion, the combination of a body, a spring-actuated finger pivoted to the body, a lever pivoted to the body and provided with a friction-roller and which bears against an extension of the finger, an adjustable arm 11, provided with a friction-roller 12, and an adjustable arm 22, provided with a friction-roller 19, substantially as and for the purpose set forth.

HARVEY E. BROWN.

In presence of—
  THOS. KNIGHT,
  E. S. KNIGHT.